United States Patent [19]

Taylor

[11] Patent Number: 5,725,057
[45] Date of Patent: Mar. 10, 1998

[54] DEVICE FOR CRUSHING STUBBLE

[76] Inventor: Kenneth Noel Taylor, 23 Gilbert St, Walgett, NSW, Australia, 2832

[21] Appl. No.: 454,550

[22] Filed: May 30, 1995

[30] Foreign Application Priority Data

May 31, 1994 [AU] Australia .................. PM5982

[51] Int. Cl.⁶ .................................. A01B 39/08
[52] U.S. Cl. ........................... 172/122; 172/121
[58] Field of Search ................ 37/303; 111/179, 111/144, 130, 200; 172/40, 27, 121, 122, 123, 95, 540, 544; 414/412, 502

[56] References Cited

U.S. PATENT DOCUMENTS

| | | | |
|---|---|---|---|
| 2,691,927 | 10/1954 | Denton | 172/121 X |
| 2,845,015 | 7/1958 | Carawan | 172/121 X |
| 2,984,024 | 5/1961 | Prenner et al. | 172/122 X |
| 3,071,197 | 1/1963 | Larson | 172/122 X |
| 3,847,437 | 11/1974 | Williams | 172/554 X |
| 4,237,984 | 12/1980 | Cobb et al. | 172/554 |
| 4,249,613 | 2/1981 | Suribner | 172/121 X |
| 5,261,218 | 11/1993 | Jones et al. | 172/122 X |

*Primary Examiner*—Terry Lee Melius
*Assistant Examiner*—Robert Pezzuto
*Attorney, Agent, or Firm*—Darby & Darby

[57] ABSTRACT

A device for crushing stubble comprising a rotatable crushing element supported by a frame. The frame is coupled by a pivotable connection to a drive mechanism which moves the device in a predefined direction across the stubble. The pivotable connection allows the crushing element to pivot about an axis substantially parallel to the predefined direction of motion so that substantial contact is maintained with the ground, thereby maximizing the extent of crushing. Limited vertical movement of the crushing element is permitted by a suspension mechanism.

18 Claims, 4 Drawing Sheets

DEVICE FOR CRUSHING STUBBLE

This invention relates to a device for crushing stubble.

Harvesting a crop of grain, straw or the like results in stumps of the grain stalks or the like being left in the ground after the crop has been cut. The stumps, otherwise known as "stubble" must, however, be removed or broken down in order to provide a suitable ground surface for the following year's crop. A number of ways of doing this are known, such as burning the stubble or ploughing the stubble into the ground. Burning the stubble, however, has the disadvantage that most of the nutrients from the stubble are not returned to the soil, furthermore, it causes the ground to dry out, which greatly increases the risk of wind erosion of topsoil, whilst ploughing the stubble into the ground reduces the rate of the stubble degrading. Also, any non-degraded stubble that remains below the ground surface may cause blockages in seeder tynes which are used to sow a subsequent crop.

The present invention seeks to provide a means of breaking up or crushing the stubble on the ground surface.

In accordance with the present invention there is provided a device for crushing stubble comprising a rotatable crushing means, a frame for supporting the crushing means and a coupling means for coupling the device to a portion of a drive means which effects motion of the device across the stubble, wherein the coupling means includes a pivot connection which permits rotation of the crushing means transversley to the direction of motion.

Preferably the device includes suspension means for accommodating limited vertical movement of the crushing means.

Preferably the crushing means comprises a plurality of radially projecting blades which preferably extend axially of the rotatable crushing means. Preferably the crushing means includes a drum which rotates about an axle supported by the frame, and the blades are formed on the periphery of the drum.

Preferably, the coupling means includes a bracket for mounting to the portion of the drive means, and a support arm for supporting the frame at one end thereof and which is pivotally coupled to the bracket, the suspension means being carried by the bracket and arranged to act between the bracket and the support arm.

Preferably, the support arm is pivotally coupled to the bracket intermediate said one end and another end thereof, and the suspension means acts on said other end.

Preferably, the suspension means includes a spring captured between the bracket and a retainer member, and a bolt coupled between the retain member and the support arm and arranged to extending through the bracket and lengthwise through the spring.

Preferably, the portion of the drive means comprises a tyne of a plough or scarifier.

Preferably the coupling means includes lugs which are adapted to fit about the portion of the drive means or the abovedescribed tyne so as to inhibit rotational movement of the coupling means in relation thereto. Preferably the coupling means has a deflector fitted thereto to deflect stubble and earth away from the coupling means.

Preferably the device according to the present invention may be constructed so as to be either drawn or pushed across the stubble.

In another aspect, there is provided an agricultural assembly which comprises a plurality of devices, as abovedescribed, which are preferably arranged in an overlapping fashion so that stubble crushed by any one given device is at least partially crushed by another of the devices arranged on the assembly, when the agricultural assembly is driven across the stubble.

The invention will now be more fully described, by way of non-limiting example with reference to the accompanying drawings in which.

Figure 1:
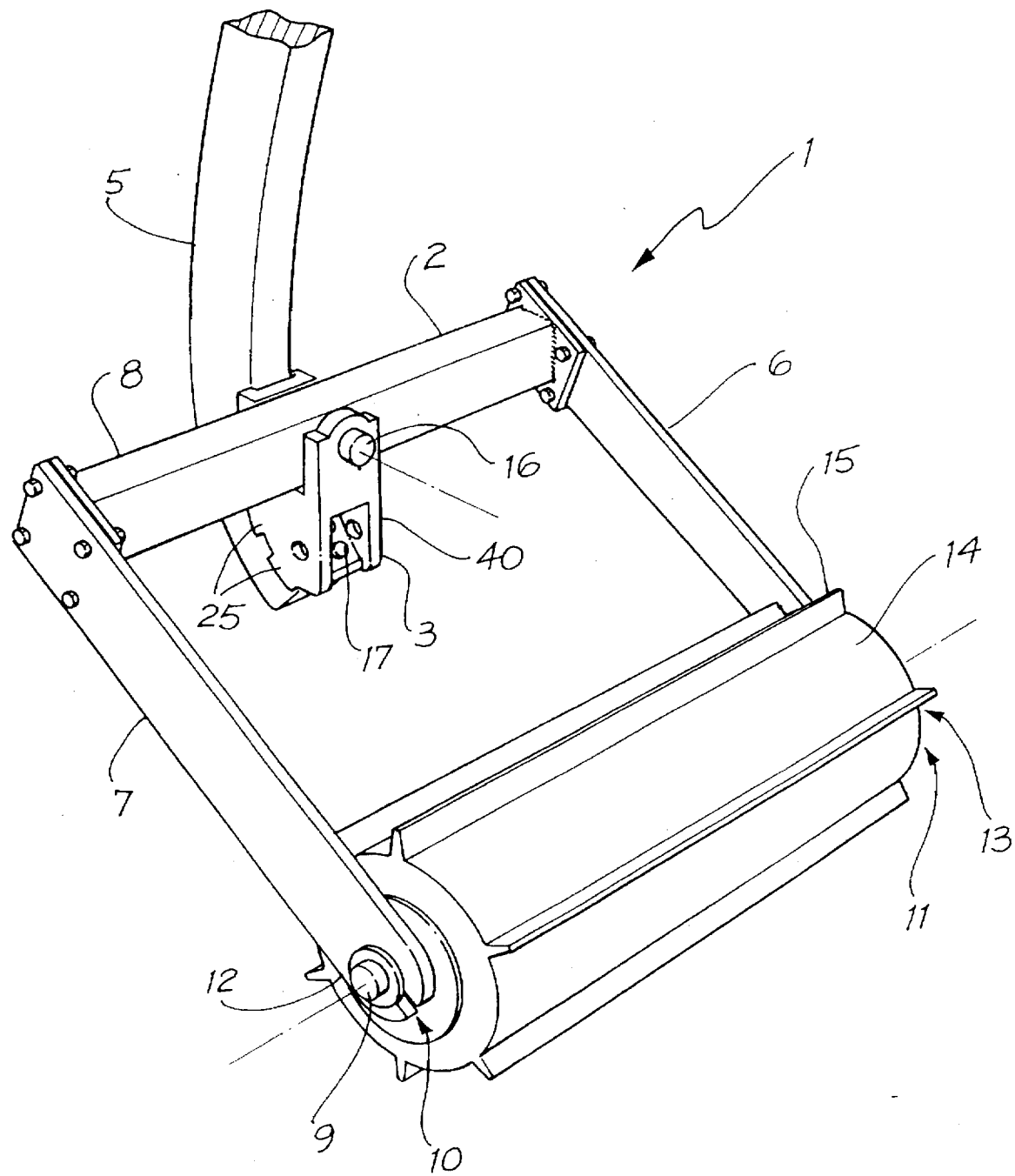
FIG. 1 is a perspective view of a device in accordance with the present invention.

A device 1, as shown in FIG. 1, comprises a frame 2 formed of two side members 6 and 7 and a cross member 8, with a rotatable crushing means having an axle 9 supported in openings 10, 11 formed in ends 12, 13 of the side members 6 and 7. The crushing means is in the form of a drum 14 having a plurality of axially extending blades 15 which project radially therefrom. The device 1 also comprises a coupling means 40 in the form of a bracket 3 for attaching the device 1 to a portion 5 of a drive means (not shown), which supplies the driving force for either pushing or pulling the device across the ground surface.

Figure 2:
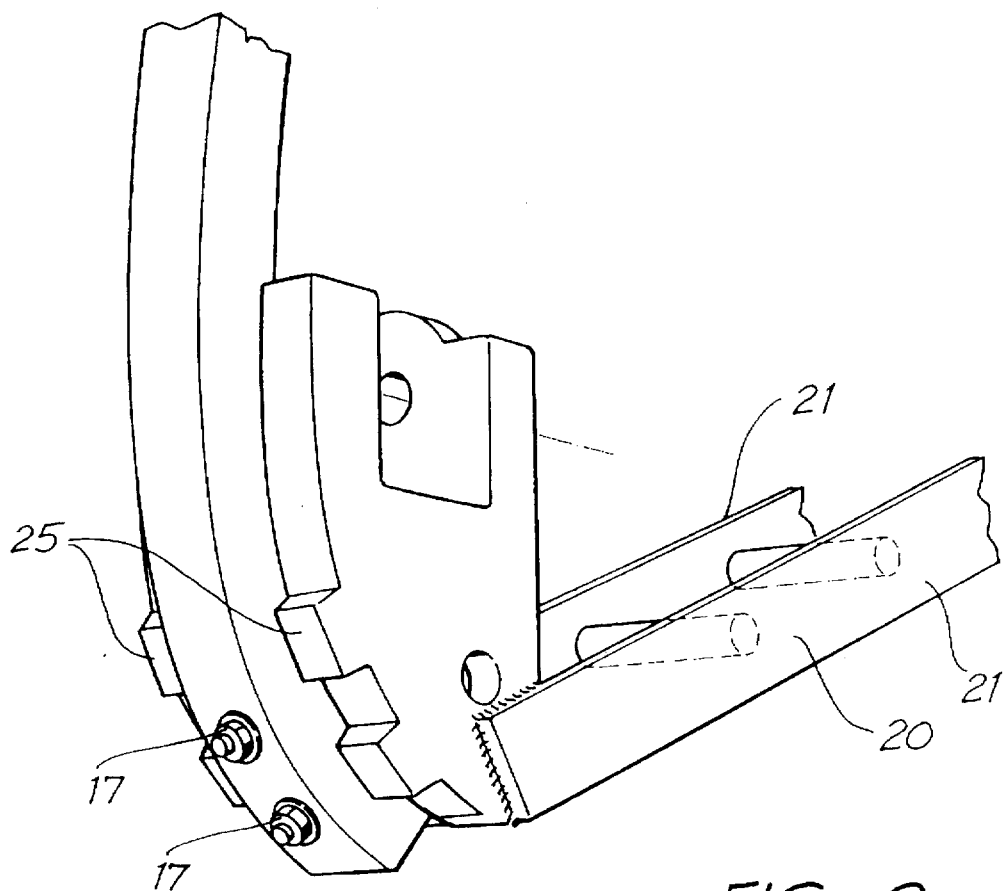
FIG. 2 is a partial perspective view of a coupling means used in the device of FIG. 1.

The bracket 3 is mounted to the cross member 8 of the frame 2 by pin 16 and is secured to portion 5 by bolts 17. The bracket also preferably has lugs 25, as shown in FIG. 2, which protrude along the sides of the portion 5 so as to inhibit rotation of the bracket 3 relative to portion 5 when the device 1 is in use. A deflecting means 20 may also be fitted to the bracket 3 to prevent build up of broken-up straw and earth on the bracket. The deflecting means 20 is preferably in the form of interconnecting splines 21, extending from either side of the bracket 3 as shown in FIG. 2, so as to deflect the broken straw and earth downwardly and away from the bracket 3.

Figure 3:
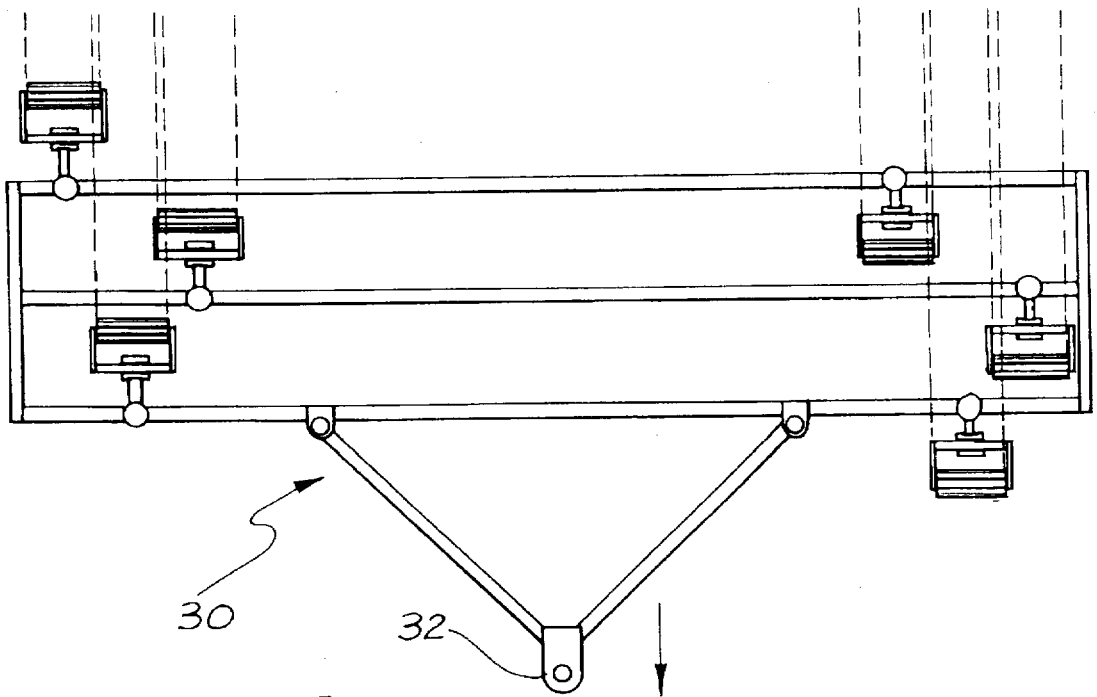
FIG. 3 is a schematic plan view of a plough assembly in accordance with another aspect of the present invention.

The drum size may vary in diameter and length—according to a particular machine it is designed to fit—i.e. various makes of ploughs or scarifiers are available to which the device 1 may be fitted. The drum 14 preferably has a diameter in the order of 0.2 meters and a length in the order of 0.8 meters. A plurality of devices 1 of such dimensions may readily be attached to a conventional agricultural or plough assembly 30, as schematically shown on the left-hand side of the assembly 30, as viewed in FIG. 3, wherein the portion 5 to which each assembly is attached consists of one of the tynes of the assembly. The length and placement of the devices 1 is such that when the assembly is drawn forward by, for example, a tractor via pivot 32, a degree of overlap exists such that stubble which is crushed by a first device 1 is at least partially subsequently crushed again by a following device. Also, the length of the drum 14 is small enough so that the drum can maintain substantial contact with the ground surface by pivoting on pin 16, even when the assembly passes over uneven or undulating ground.

It is also possible to fit a stabilising mechanism (not shown) to the device 1, such as an arrangement of springs, to prevent the device from freely rotating about pivot 16. Such an arrangement is particularly advantageous when the assembly 30 is elevated from the ground surface for transportation along a road.

Figure 4:
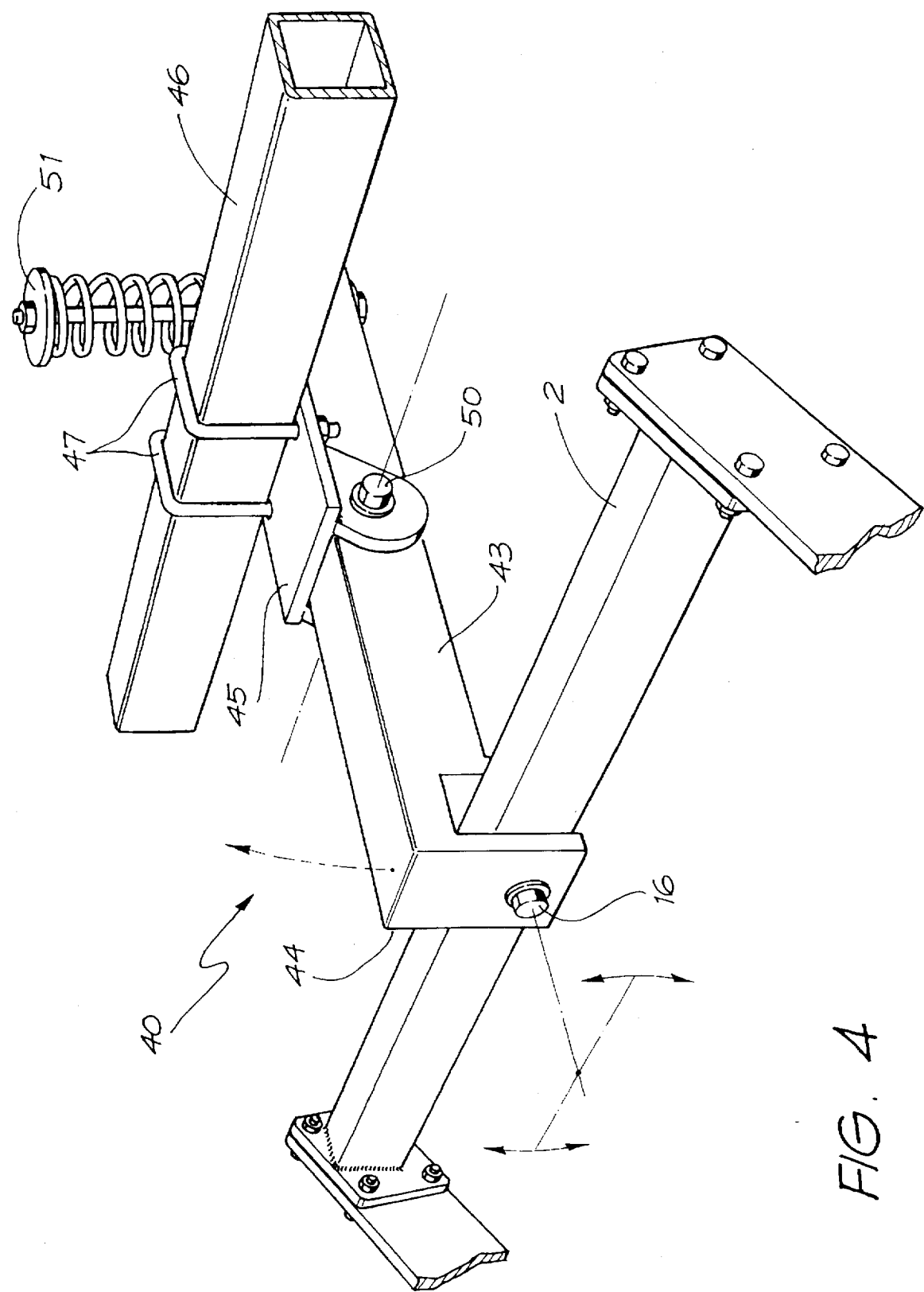
FIG. 4 is a perspective view of a device in accordance with another aspect of the invention.
Figure 5:
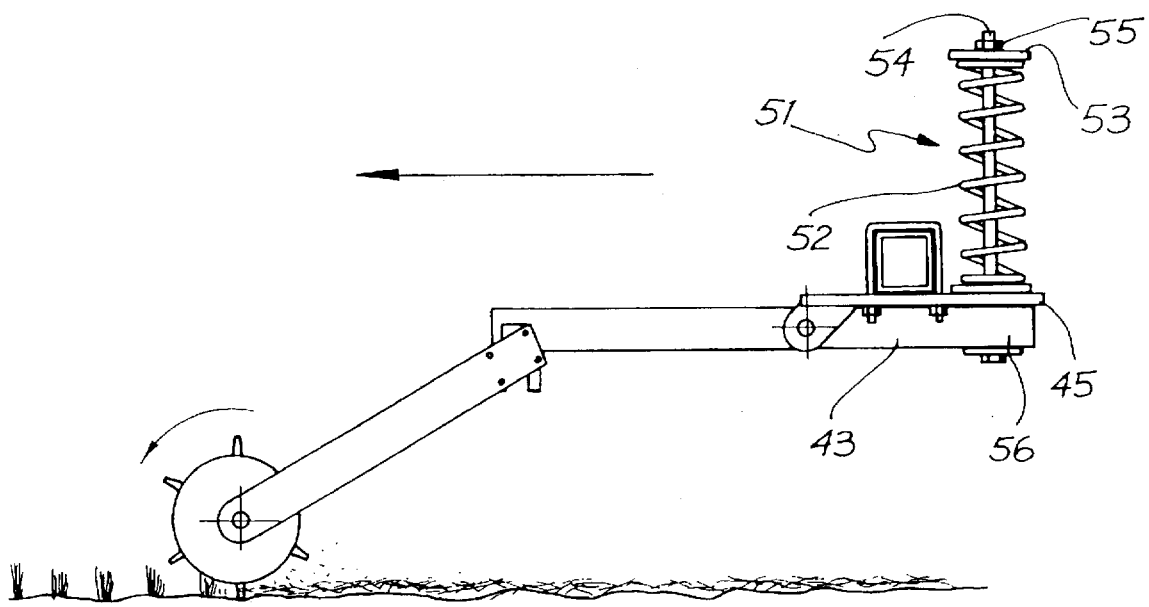
FIGS. 5 and 6 are side views of the device of FIG. 4 in use.
Figure 6:
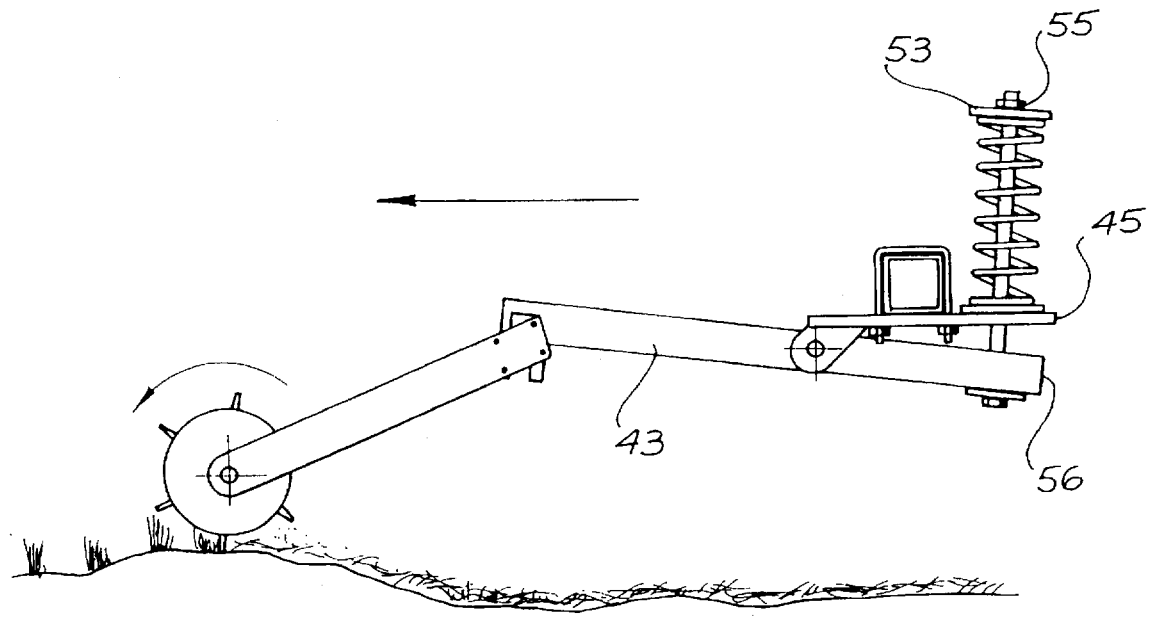

As an alternative to bracket 3, the coupling means 40 means can instead be formed of an assembly 42, as shown in FIGS. 4 to 6. The assembly comprises a support arm 43 which carries the frame 2 and drum 14 at one end 44 thereof via a pin 16 in a manner identical to that described with reference to FIGS. 1 to 3. The support arm 43 is connected to a bracket 45 which is coupled to a carrying portion 46 of a suitable drive means. The carrying portion 46 is preferably part of a frame of a plough, or similar agricultural machine. The bracket 45 includes two U-bolts 47 for securing the assembly 42 to the carrying portion 46, but any suitable securing means may instead be employed. The arm 43 and bracket 45 are connected via pivot 50, and a suspension coupling 51. The suspension coupling 51 is formed of a spring 52 which is held between the bracket 45 and a retainer member 53. A bolt 54 extends between the arm 43 and retainer member 53 and has a head 55 which abuts the retainer member. The other end of the bolt has a threaded fastener which serves to prevent the bolt pulling through the arm 43. The fastener can also be used in conjunction with a suitable washer such as a dome-shaped washer to accommodate changes in angle that the bolt makes relative to the arm 43 during operation.

During operation, the drive means is effective in pushing the drum 14 along the ground in a direction toward the left, as viewed in FIGS. 5 and 6, although the device may just as readily be pulled to the right, as viewed. An arrangement where the device is fitted to the agricultural or plough assembly 30 and pulled across a ground surface is again represented to the left hand side of the assembly 30 as viewed in FIG. 3, whereas the arrangement wherein the device is pushed is illustrated on the right hand side of the assembly 30 as viewed. When the drum 14 encounters an uneven ground surface, and is driven upwardly, the arm can rotate in a clockwise direction, as viewed, about pivot 50 so that the end 56 of the arm moves away from the bracket 45. This results in the bolt being drawn downwardly through the bracket 45 such that the bolt head 54 and retainer member 53 move toward the bracket, thereby compressing the spring 52. As such, the vertical movement of the drum 14 will be accommodated by the spring and unnecessary stresses which would otherwise be experienced by the various components of the device and frame can thereby be reduced, as compared to an arrangement where no suspension means is provided.

As can be seen from the above, the device of the present invention provides a convenient means of breaking up or crushing straw after harvest without the need for burning or ploughing the straw into the ground. Also, the particular arrangement of the bracket 3 or 45 permits the device 1 to be attached to any conventional plough assembly and, additionally, the pivot pin 16 of the bracket 3 results in the device being suitable for uneven or undulating agent.

Many modifications and variations may be made to the device and assembly of the present invention without departing from the spirit and scope of the invention as defined in the following claims.

I claim:

1. A device for crushing stubble constructed to be attached to a drive assembly including a main frame connected to a drive means, the drive assembly effecting motion of the device across the stubble in a predefined direction comprising:

a rotatable crushing means, a subframe for supporting the crushing means, and coupling means for coupling the subframe to the main frame, wherein the coupling means includes a pivot connection which permits pivotable movement of the subframe relative to the main frame about an axis substantially parallel to the predefined direction of motion.

2. A device as claimed in claim 1 further including a suspension means for accommodating limited vertical movement of the crushing means.

3. A device as claimed in claim 1 wherein the crushing means comprises a plurality of radially projecting blades.

4. A device as claimed in claim 3 wherein the blades extend axially of the rotatable crushing means.

5. A device as claimed in claim 4 wherein the crushing means includes a drum which rotates about an axle supported by the subframe, and the blades are formed on the periphery of the drum.

6. A device as claimed in claim 2 wherein the coupling means includes a bracket for mounting to the portion of the drive means, and a support arm for supporting the subframe at one end thereof and which is pivotally coupled to the bracket, the suspension means being carried by the bracket and arranged to act between the bracket and the support arm.

7. A device as claimed in claim 6, wherein the support arm is pivotally coupled to the bracket intermediate said one end and another end thereof, and the suspension means acts on said other end.

8. A device as claimed in claim 7, wherein the suspension means includes a spring captured between the bracket and a retainer member, and a bolt coupled between the retainer member and the support arm and arranged to extend through the bracket and lengthwise through the spring.

9. A device as claimed in claim 1 wherein the coupling means includes a bracket adapted to be secured to a tyne of a plough or scarifier.

10. A device as claimed in claim 9 wherein the bracket includes lugs which are adapted to fit about the tyne so as to inhibit rotational movement of the coupling means in relation thereto.

11. A device as claimed in claim 8 wherein the bracket has a deflector fitted thereto to deflect at least one of stubble and earth away therefrom.

12. An agricultural assembly comprising a plurality of devices for crushing stubble, each device being constructed in accordance with the device of claim 1.

13. An agricultural assembly as claimed in claim 12, wherein the devices are arranged on said main frame in an overlapping fashion so that stubble crushed by one given device is at least partially crushed by another of the devices arranged on the assembly, when the assembly is driven across the stubble.

14. A device as claimed in claim 3 wherein the crushing means includes a drum which rotates about an axle supported by the subframe, and the blades are formed on the periphery of the drum.

15. A device as claimed in claim 6, wherein the suspension means includes a spring captured between the bracket and a retainer member, and a bolt coupled between the retainer member and the support arm and arranged to extend through the bracket and lengthwise through the spring.

16. A device as claimed in claim 15, wherein the bracket has a deflector fitted thereto to deflect at least one of stubble and earth away therefrom.

17. A device as claimed in claim 7, wherein the bracket has a deflector fitted thereto to deflect at least one of stubble and earth away therefrom.

18. An agricultural assembly comprising a plurality of devices for crushing stubble as claimed in claim 17, wherein the devices are arranged in an overlapping fashion on said main frame so that stubble crushed by one given device is at least partially crushed by another of the devices arranged on the assembly, when the assembly is driven across the stubble.

* * * * *